United States Patent [19]
Lohf et al.

[11] Patent Number: 5,503,354
[45] Date of Patent: Apr. 2, 1996

[54] TELECOMMUNICATION OVERHEAD CABLE DISTRIBUTION UNIVERSAL SUPPORT BRACKET

[75] Inventors: Lloyd W. Lohf; Glen M. Larson, both of Spokane, Wash.

[73] Assignee: Telect, Inc., Spokane, Wash.

[21] Appl. No.: 177,334

[22] Filed: Jan. 4, 1994

[51] Int. Cl.⁶ .................................................. F16L 3/00
[52] U.S. Cl. ........................... 248/58; 248/207; 248/68.1; 248/49; 248/231.61; 248/911
[58] Field of Search .............................. 248/68.1, 49, 58, 248/207, 911, 230, 231.6, 214, 59; 24/588, 305, 578, 580, 135 N

[56] References Cited

PUBLICATIONS

AT&T Catalog Network Cable Systems, "LIghtguide Fiber Optic Cable and Apparatus," pp. 6–30 through 6–35, 1992 or prior.
Hendry Telephone Products Catalog, "Superstructures," 1991.
ADC Telecommunications, "FiberGuide Fiber Management System User's Manual," 1st Edition, Issue 1, Aug. 1989.

*Primary Examiner*—Karen J. Chotkowski
*Attorney, Agent, or Firm*—Wells, St. John, Roberts, Gregory & Matkin

[57] ABSTRACT

A preferred embodiment of the universal support bracket 10 is illustrated for supporting a fiber optic cable carrier 28 in a telecommunication overhead cable distribution system 12. The bracket 10 includes a body section 40 that has an arm 46 that extends outward with a supporting surface for receiving and supporting cable carrier 28 at various spaced locations. The support bracket 10 includes a second body section 40 that is supported therebetween by a brace 44 in which the body section 42 has complementary clamping members 54 and 56. The body section 42 has a vertical aperture 64, a horizontal aperture 68 and a rectangular aperture 72 for receiving and clamping the bracket 10 securely to the support rods either in an upright orientation or in a tilting, sideways orientation or to a side rail 18 of the distribution system.

9 Claims, 5 Drawing Sheets

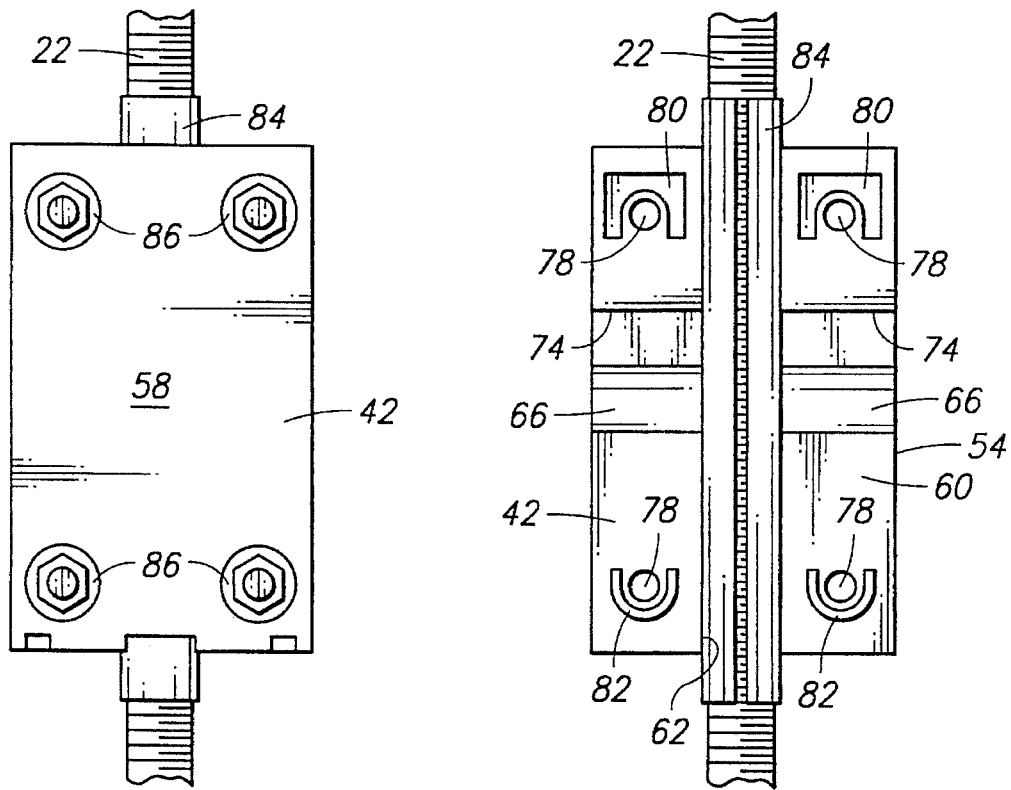
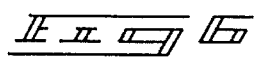 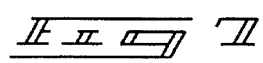
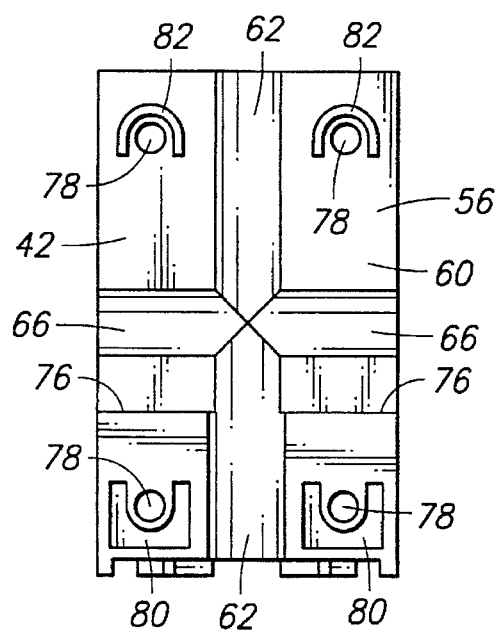
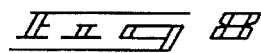

5,503,354

TELECOMMUNICATION OVERHEAD CABLE DISTRIBUTION UNIVERSAL SUPPORT BRACKET

TECHNICAL FIELD

This invention relates to telecommunication overhead distribution support brackets for supporting telecommunication fiber optic cables.

BACKGROUND OF THE INVENTION

Most telecommunication overhead distribution systems for supporting fiber optic cables requires a multitude of parts and components depending upon the location and configuration of the fiber optic cable carriers and their supporting structure. Consequently, the user, most generally a telephone company, is required to order multiple sizes and configurations of support brackets before undertaking an initial or retrofit fiber optic installation project. Frequently this causes enhanced inventory, stocking, ordering and obsolete part problems.

One of the principal objects and objectives of this invention is to provide an improved universal bracket for supporting telecommunication fiber optic carriers in an overhead distribution system.

These and other objects and objectives of this invention will become apparent upon reading and understanding the following drawings and detailed description of a preferred embodiment.

BRIEF DESCRIPTION OF THE DRAWINGS

Preferred embodiments of the invention are described below with reference to the accompanying drawings, which are briefly described below.

FIG. 6 is a rear view of the universal bracket illustrated in FIGS. 4 in which a base section of the bracket is clamped to the vertical rod;

FIG. 7 is a rear view similar to FIG. 6 except with a base mounting plate removed showing a rear view of a base body with a rod sleeve encircling the support rod; and FIG. 8 is a front view of the base mounting plate that interfaces with the base body to clamp the bracket base to the overhead support structure.

DETAILED DESCRIPTION OF THE PREFERRED EMBODIMENTS

This disclosure of the invention is submitted in furtherance of the constitutional purposes of the U.S. Patent Laws 'to promote the progress of science and useful arts" (Article 1, Section 8).

Figure 1:
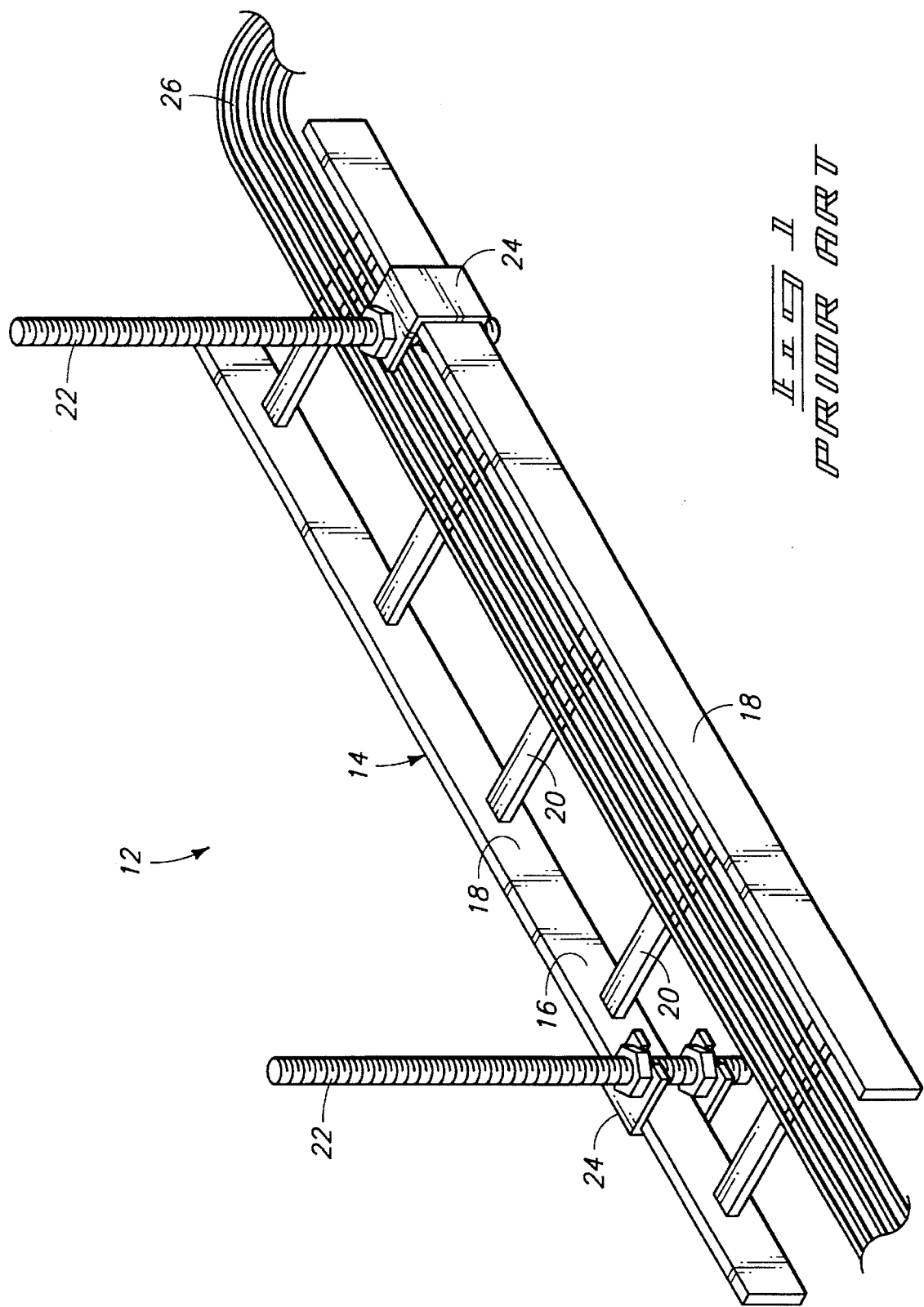
FIG. 1 is an isometric view of a portion of a typical telecommunication overhead cable distribution system for supporting telecommunication cables, in which a single horizontal support ladder frame is shown suspended by depending support rods.

FIGS. 2–8 illustrate a preferred embodiment of a fiber optic cable carrier universal support bracket generally designated with the numeral 10. Such bracket 10 is utilized in a telecommunication overhead cable distribution system generally designated with the numeral 12 shown by a fragmentary portion illustrated in FIGS. 1–3. The telecommunication overhead cable distribution system 12 generally includes a superstructure 14 that frequently includes a horizontal ladder 16 with spaced side rails 18 having ladder rungs 20 extending between the rails 18 at spaced intervals. The ladder 16 is generally supported from an overhead rod system (not shown) by support rods 22. Specifically, the ladder 16 is supported on the support rods 22 by rail support brackets 24. The telecommunication overhead cable distribution system 12 is generally designed to support and distribute communication cables 26 from one location to another in a central telecommunication office.

Figure 2:
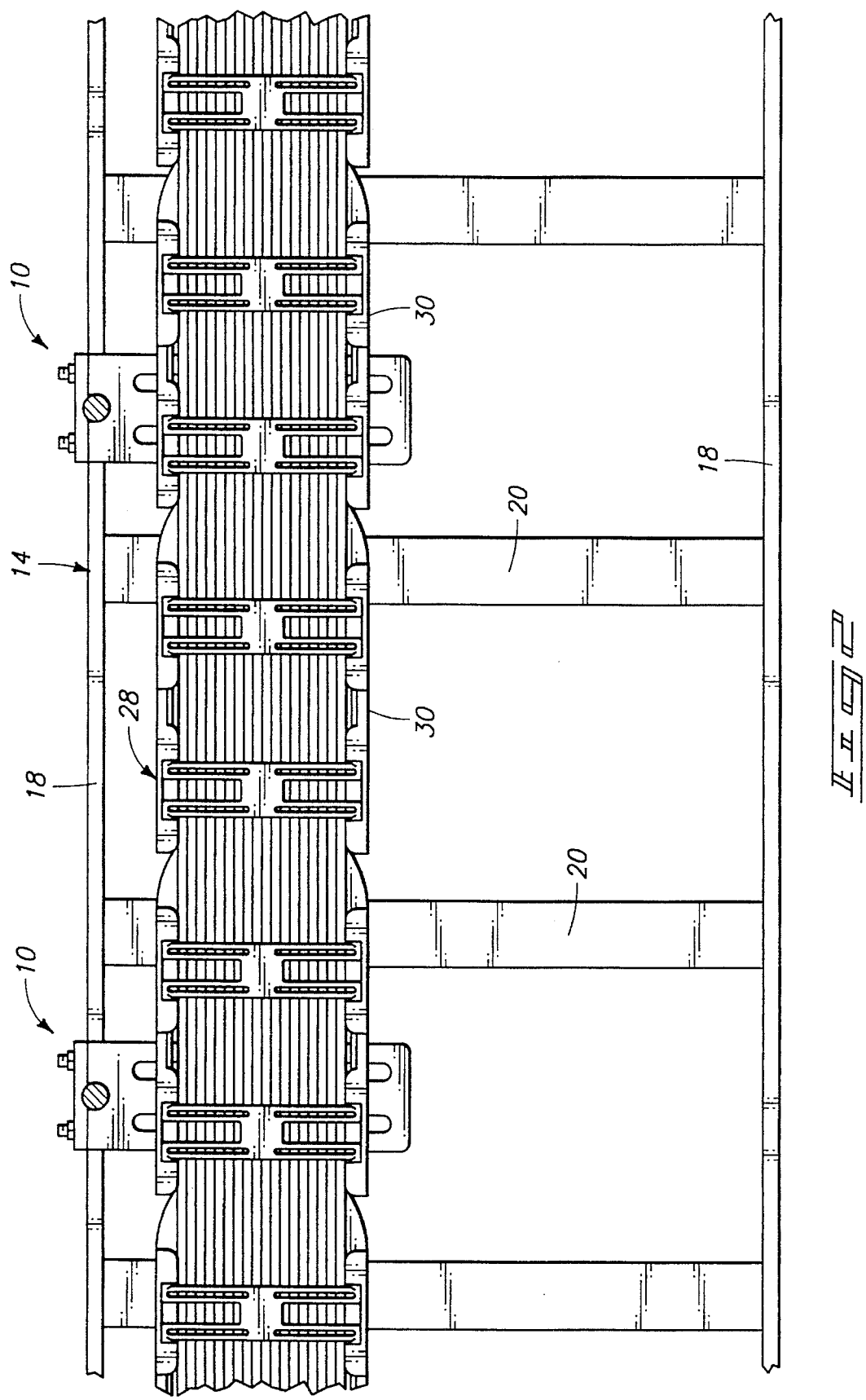
FIG. 2 a plan view of the portion of the telecommunication overhead cable distribution system illustrating a preferred embodiment of a universal bracket supporting an overhead fiber optic cable carrier in which the carrier is supported in a rather linear orientation.
Figure 3:
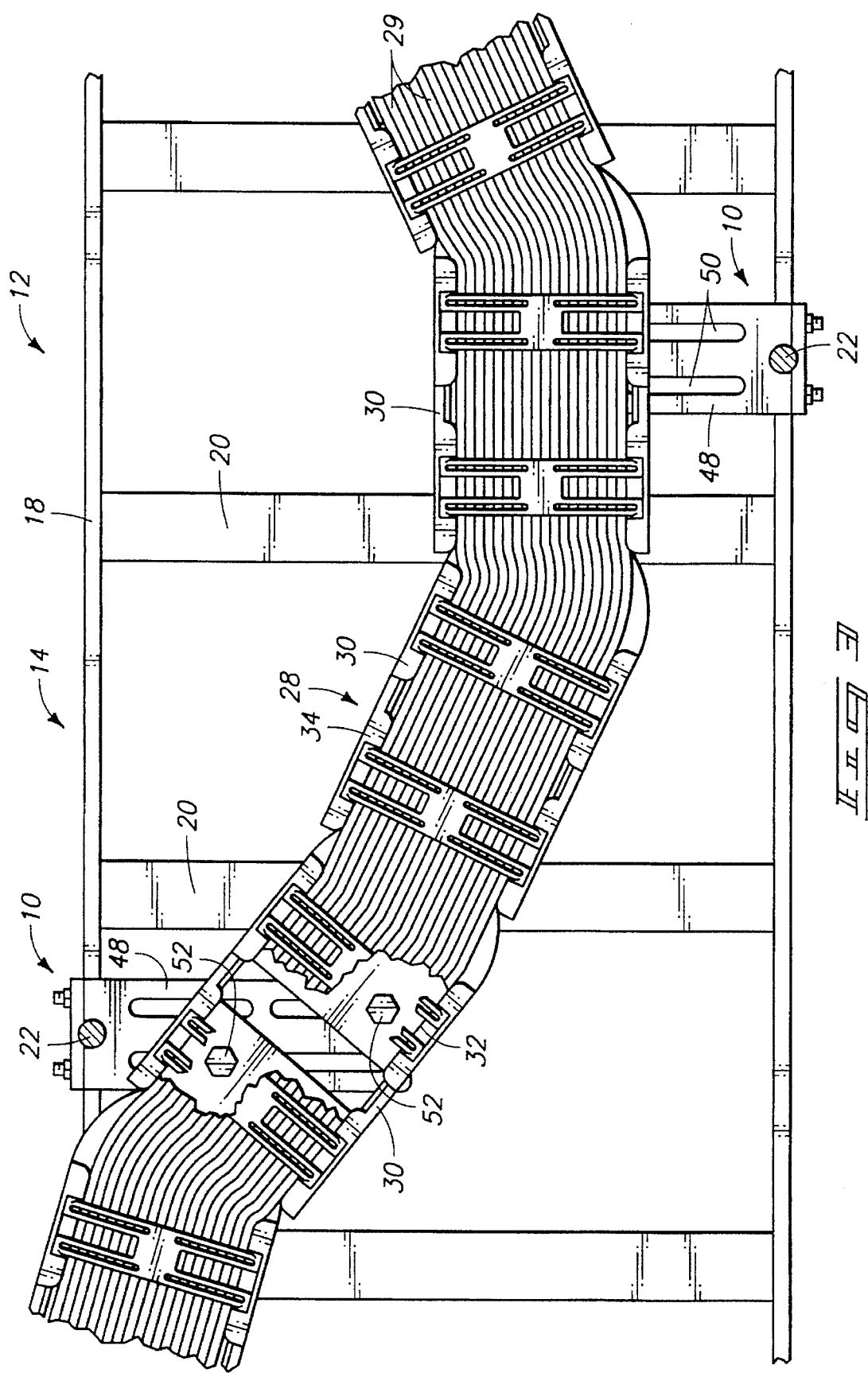
FIG. 3 is a plan view similar to FIG. 2 except showing the universal brackets supporting the overhead fiber optic cable carrier in an articulated orientation.

The present universal support bracket 10 is designed to support a fiber optic cable carrier 28 as illustrated in FIGS. 2 and 3 on the cable distribution system 16. The carrier 28 supports a plurality of fiber optic cables 29. The carrier 28 is preferably composed of a plurality of modules 30 that are interconnected to provide an articulating structure in which the cables 29 may be aligned in a rather linear orientation with respect to the support ladder 16 or in a curved or articulated orientation as illustrated in FIG. 3. A preferred embodiment of the fiber optic cable carrier 28 is described more fully in U.S. patent application Ser. No. 990,980, filed Dec. 14, 1992, entitled "Telecommunication Overhead Cable Distribution Assembly", and is incorporated herein should the reader desire additional information concerning the details of the carrier 28. However for the purpose of this invention, various types of carriers 28 could be utilized, and the preferred embodiment of the universal support bracket 10 could be utilized with various types of fiber optic cable carriers other than the one described in the above-identified patent application.

Each module 30 has a base 32 with an enclosure 34 extending upward and over cables 29 to enclose and protect the fiber optic cables 29. The purpose of the universal support bracket 10 is to engage and support the modules by engaging the underside of the base 32 and supporting the enclosure 34 in a desired orientation to in turn support the fiber optic cables 29 at a position normally elevated above the superstructure 14.

FIG. 2 illustrates the mounting of two universal support brackets 10 on two side-by-side support rods 22, along a side rail 18, to support the carrier 28 in a substantially linear orientation. FIG. 3 illustrates a somewhat different orientation in which one of the brackets 10 is mounted to a support rod 22, on one side of the ladder 16, and a second bracket 10 is mounted to a support rod 22, on the other side of the ladder 16, to support the carrier 28 in a curved or articulated orientation.

The bracket 10 is very versatile to support the carrier 28 at almost any orientation on the overhead cable distribution system 12. Specifically, the universal support bracket 10 may be mounted directly to the side rails 18 or directly to the support rods 22 as desired.

Figure 4:
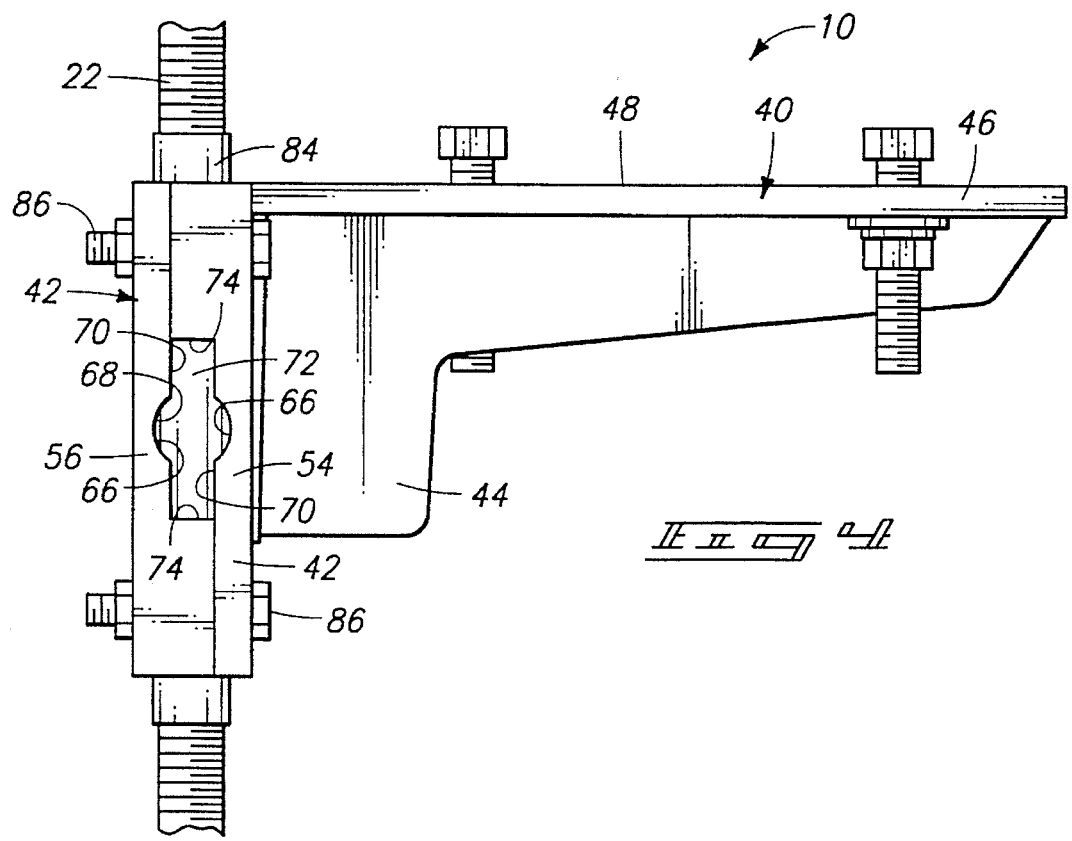
FIG. 4 is a fragmentary side view of a depending support rod with one of the universal brackets mounted thereon in an upright orientation for supporting the overhead fiber optic cable carrier in a horizontal orientation.
Figure 5:
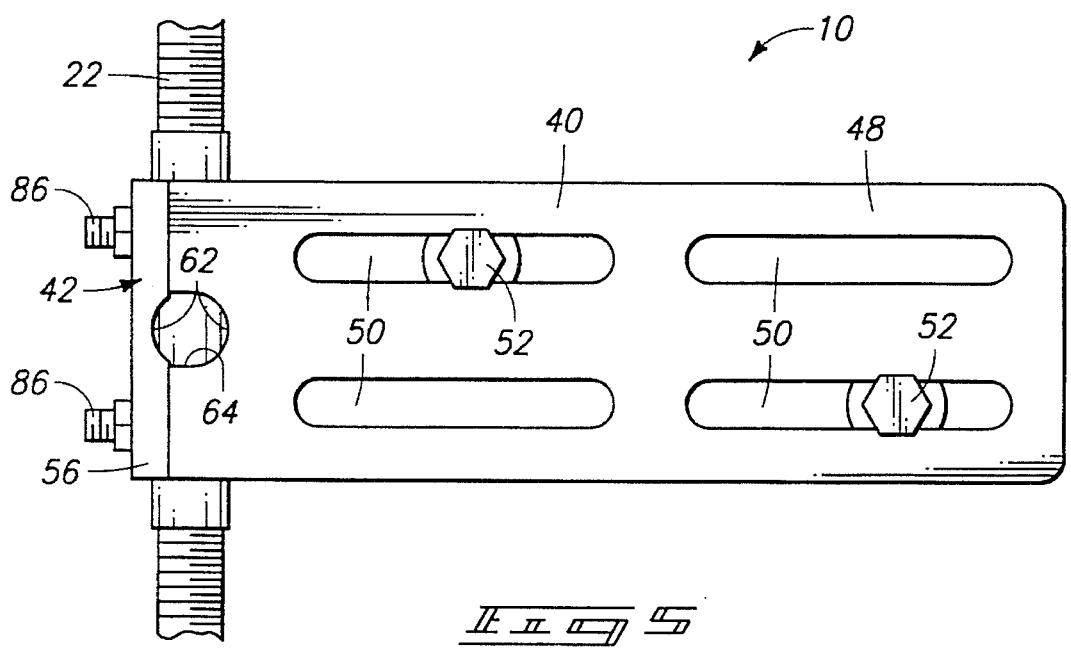
FIG. 5 is a fragmentary side view of the side of a depending support rod similar to FIG. 4, except showing the universal bracket in an alternate side orientation for supporting the overhead fiber optic cable carrier in a vertical orientation.

Turning more specifically to the details of the structure of the universal support bracket 10, the reader's attention is directed to FIG. 4–8. In FIG. 4, the universal support bracket 10 is mounted in an upright orientation to a vertically oriented support rod 22 to support the carrier in a horizontal orientation. In FIG. 5, the universal support bracket 10 is mounted to the vertical support rod 22 with the bracket 10 positioned in a sideways orientation to support the carrier 28 in a vertical orientation. Although not shown, the support bracket 10 may be mounted directly to a side rail 18 to support the carrier 28 in a substantially horizontal orientation.

The universal support bracket 10 includes a first body section 40 that extends outward from a second body section 42. In the preferred configuration, body sections 40 and 42 are oriented substantially perpendicular to each other. A brace 44 operatively interconnects the body sections 40 and 42 to provide sufficient strength to support carriers 28 containing a large number of fiber optic cables 29. The body section 40 includes an arm 46 having an upper support surface 48 for engaging the underside of the base 32 of the carrier 28. A plurality of elongated apertures 50, as illustrated in FIG. 5, are formed in the arm 46 at both longitudinally spaced and laterally spaced locations to receive fastening bolts 52 that are utilized for securing the modules 30 of the carrier 28 to the upper surface 48 as illustrated in FIG. 3.

The body section 42 includes two complementary clamp members 54 and 56 that receive and securely mount the support bracket 10 to either the support rod 22 or the side rails 18. Each of the complementary clamp members 54 and 56 have an outer face 58 and an inner face 60. The inner faces 60 have complementary vertical cylindrical clamping surfaces 62 that define a vertical aperture 64 for receiving a support rod 22 therebetween to secure the bracket 10 to the support rod. Additionally, each of the inner faces 60 have complementary horizontal cylindrical clamping surfaces 66 for enabling the support bracket 10 to be mounted to a support rod 22 in the orientation illustrated in FIG. 5. The horizontal cylindrical clamping surfaces 66 form a horizontal aperture 68 that extends through the body section 42 in a horizontal orientation to receive the support rod 22 with the bracket 10 positioned on its side as illustrated in FIG. 5. Additionally, the inner faces 60 includes rail clamping surfaces 70 (FIG. 4) that form a rectangular aperture 74 to receive a rail 18. The rectangular aperture 72 forms an upper shoulder 74 and a lower shoulder 76 that additionally define the rectangular aperture 72 and bear against the upper and lower surfaces of the rail 18. It should be noted that each of the apertures 64, 68 and 72 are formed in the same plane of the body section 42 to facilitate the easy and rapid mounting of the bracket to either the support rod 22 or a side rail 18.

The bracket 10 includes fastening means for fastening the clamping members 54 and 56 together to secure the bracket onto the support rod 22 or side rail 18. Fastening means includes connector apertures 78 that are formed through both of the clamping members 54 and 56 as illustrated in FIGS. 7 and 8. The fastening means further includes curved mating female cavities 80 formed in each of the clamping members 54 and 56 for receiving complementary curved male mating ribs or elements 82 to facilitate secure mounting of the bracket 10 to the support rod 22 and to prevent the bracket from tilting from one side to another under the substantial weight of the fiber optic cable carrier 28.

In a preferred embodiment, the bracket includes a split tubular sleeve 84 made of a gasket material to adjust for any differences in diameter between different diameter supporting rods 22. This enables the bracket 10 to be universally used in a wide variety of diameters of supporting rods 22. As illustrated in FIGS. 4 and 5, clamping bolts or fasteners 86 extend through the connecting apertures 78 to securely hold the complementary clamping members 54 and 56 together, bringing the corresponding cylindrical clamping surfaces or rail clamping surfaces into engagement with their respective component to securely fasten the bracket to the support rod 22 or side rail 18.

Although the bracket 10 appears to be rather simple in design, it has the ability to serve as a universal support bracket 10 with sufficient strength to support rather heavy fiber optic cable carriers 28 and to enable the carriers 28 to be easily mounted to the brackets 10. The bracket 10 can be easily, rigidly affixed to the support rods 22 or side rails 18 so that the brackets 10 will not twist or tilt under the substantial loads.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A telecommunication overhead cable distribution universal bracket for supporting a fiber optic cable carrier to either a substantially vertical support rod or to a substantially horizontal ladder rail of a telecommunication overhead cable distribution support structure, comprising:

a first bracket body section for securing the bracket to either the support rod or the ladder rail;

said first bracket body section having a first securing means for securing the bracket to the support rod;

said first bracket body section have a second securing means for securing the bracket of the ladder rail;

a second bracket body section extending outward in a substantially horizontal direction from the first body section for supporting the fiber optic cable carrier;

wherein the first securing means includes a first pair of complementary clamping surfaces that are formed by a first aperture extending vertically through the first body section transverse to the second bracket body section for receiving the support rod therein with the first clamping surfaces operatively engaging the support rod and securing the universal bracket to the support rod in an upright orientation; and wherein the second securing means includes a second pair of complementary second clamping surfaces that are formed by a second aperture extending horizontally through the first body section transverse to the vertically extending aperture and transverse to the second bracket body section for receiving the rail therein with the second pair of clamping surfaces operatively engaging the rail and securing the universal bracket to the horizontal support rail in an upright orientation.

2. The telecommunication overhead cable distribution universal bracket as defined in claim 1 wherein the first securing means includes a third pair of complementary third clamping surfaces that are formed by a third aperture extending horizontally through the first body section transverse to the vertically extending aperture and transverse to the second bracket body section for receiving the support rod therein with the third pair of clamping surfaces operatively engaging the support rod and securing the universal bracket to the vertical support rod in an sideways orientation.

3. The telecommunication overhead cable distribution universal bracket as defined in claim 1 wherein the first and second apertures intersect each other transverse to the second bracket body section.

4. The telecommunication overhead cable distribution universal bracket as defined in claim 1 wherein the first, second and third apertures intersect each other in substantially the same plane that is transverse to the second bracket body section.

5. The telecommunication overhead cable distribution universal bracket as defined in claim 4 the two complementary clamping members have complementary mating female and male elements to align the two complementary clamping members relative to each other to firmly clamp the support rod or the ladder rail therebetween.

6. The telecommunication overhead cable distribution universal bracket as defined in claim 1 wherein the second bracket body section includes an elongated arm with a plurality of elongated slots formed therein to enable the fiber optic carrier to be attached to the second bracket body section at various angles relative to the universal bracket.

7. The telecommunication overhead cable distribution universal bracket as defined in claim 1 wherein the first bracket body section includes two complementary clamping members having the first and second securing means for securing the bracket to a support rod or to the ladder rail.

8. The telecommunication overhead cable distribution universal bracket as defined in claim 7 wherein the two complementary clamping members have internal surfaces for engaging the support rod or the ladder rail to secure the bracket to the support rod or to the latter rail.

9. The telecommunication overhead cable distribution universal bracket as defined in claim 7 wherein one of the two complementary clamping members is removable relative to the other to receive either the support rod or the ladder rail therebetween.

\* \* \* \* \*